United States Patent

[11] 3,593,307

| [72] | Inventors | James Reid Gouge, Jr.<br>Vienna;<br>Robert L. Barron, Burke, both of, Va. |
|---|---|---|
| [21] | Appl. No. | 761,162 |
| [22] | Filed | Sept. 20, 1968 |
| [45] | Patented | July 13, 1971 |
| [73] | Assignee | Adaptronics, Inc.<br>McLean, Va. |

[54] REDUNDANT, SELF-CHECKING, SELF-ORGANIZING CONTROL SYSTEM
18 Claims, 5 Drawing Figs.

[52] U.S. Cl. .................................................. 340/172.5,
340/146.1
[51] Int. Cl. ................................................. G06f 11/00
[50] Field of Search .......................................... 235/153,
157; 340/172.5, 146.1, 419; 317/22, 26, 27, 36;
307/204, 211

[56] References Cited
UNITED STATES PATENTS

| 3,309,571 | 3/1967 | Gilker .................... | 317/22 |
|---|---|---|---|
| 3,315,127 | 4/1967 | Lenz ...................... | 317/22 |
| 3,335,403 | 8/1967 | Mann et al. ............. | 340/146.1 |
| 3,460,096 | 8/1969 | Barron .................... | 340/172.5 |
| 3,519,998 | 7/1970 | Barron .................... | 340/172.5 |
| 2,803,703 | 8/1957 | Sherwin .................. | 340/172.5 X |
| 3,348,197 | 10/1967 | Akers, Jr. et al. ...... | 340/172.5 X |
| 3,037,698 | 6/1962 | Saxenmeyer ............. | 235/153 |

OTHER REFERENCES

Teoste, R. " Design of a Repairable Redundant Computer."
IN IRE TRANSACTIONS ON ELECTRONIC COMPUTERS
Vol. EC-11, No. 5; October, 1962; p.643— 649.

*Primary Examiner*—Paul J. Henon
*Assistant Examiner*—Melvin B. Chapnick
*Attorney*—Jay M. Cantor ABSTRACT: A self-organizing control system having a plurality of self-organizing controllers acting in parallel to provide actuation signals for plant control. The controllers are constantly monitored to locate faulty controllers. When one controller does not compare with the others, it is initially coerced to operate correctly and, after a predetermined period, if correct operation is not provided, the faulty controller is removed from the system. In one embodiment, an odd number of controllers is always in the system to provide control on a majority basis. Therefore, the removal of a faulty controller will require the removal of an operating controller as well.

INVENTORS
JAMES REID GOUGE, JR.
ROGER L. BARRON

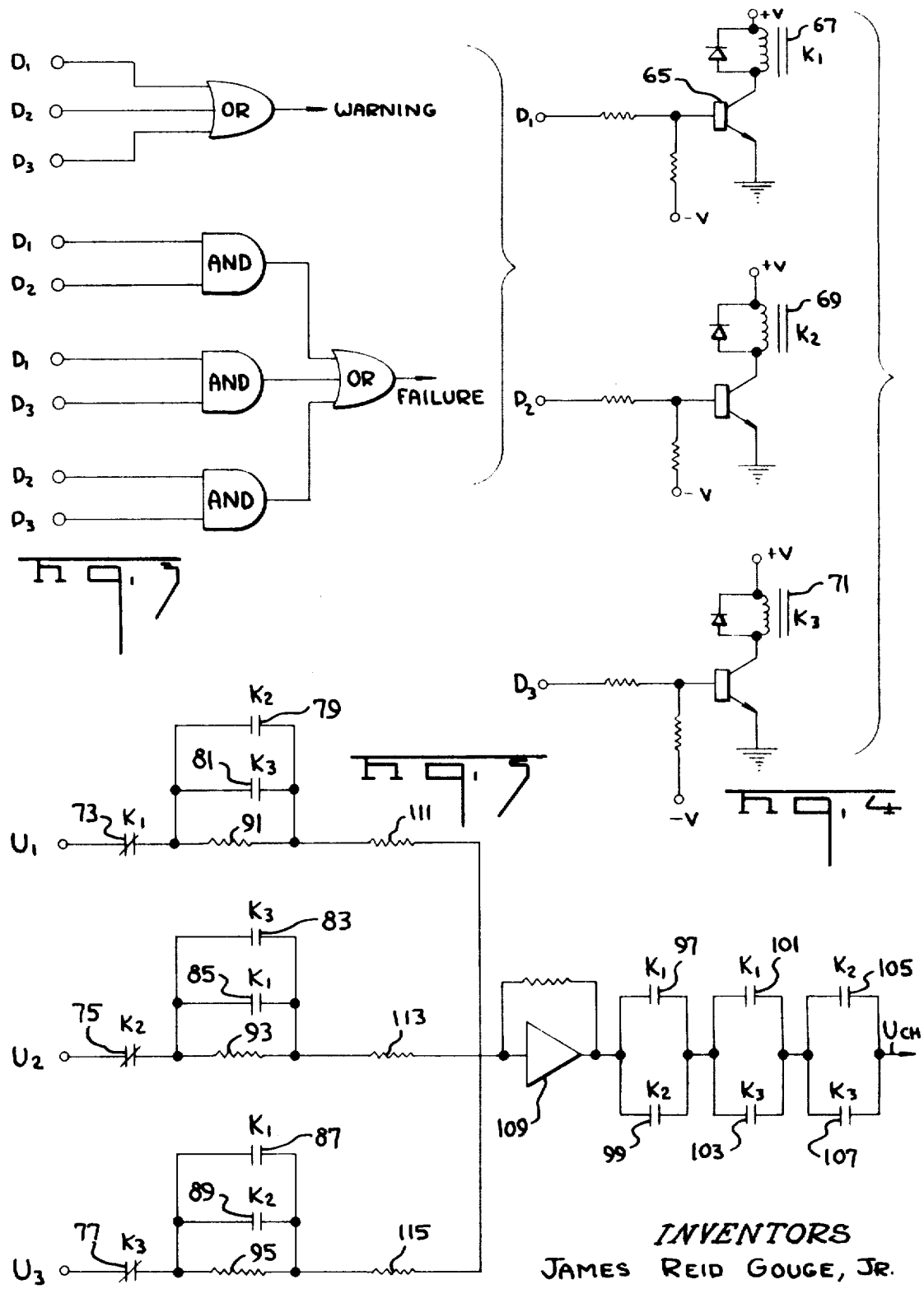

REDUNDANT, SELF-CHECKING, SELF-ORGANIZING CONTROL SYSTEM

This invention relates to a redundant, self-checking, self-organizing control system and, more specifically, to plural self-organizing control systems connected in parallel and capable of comparing the behavior of each controller with the other self-organizing controllers to determine malfunction thereof on a majority vote basis and eliminate malfunctioning controllers from the system.

Self-organizing control systems have recently been introduced into the art and provide the advantages of high-speed self-organizing control requiring a minimum of information storage and capable of single or multiple goal and single or multiple actuator control in a plant under control wherein the levels of control have large or inconsequential levels of interaction. Systems of the above-mentioned types have found significant utility in the art, such systems being disclosed in the applications of Roger L. Barron, Ser. No. 565,162, now U.S. Pat. No. 3,460,096 filed July 14, 1966 for Self-Organizing Control System and Ser. No. 671,743, filed Sept. 29, 1967 for Self-Organizing Control System for Providing Multiple-Goal Multiple-Actuator Control, now U.S. Pat. No. 3,519,998 these applications being incorporated herein in their entirety by reference. While self-organizing control systems of these types operate efficiently, there is always the possibility of failure which is inherent in any system. It is apparent that when large systems are being controlled substantially entirely by a self-organizing control system, it is highly desirable and at times mandatory that failures be completely eliminated or kept to a minimum.

In accordance with the present invention, there is provided a self-organizing control system having a plurality of self-organizing controllers connected in parallel, each responsive to the same control and measured response variables, to provide actuator excitation signals. These actuator excitation signals are then summed to provide the actuation signal for the plant control. Each of the paralleled self-organizing control units is constantly monitored whereby the systems are compared and any single one of these systems not comparing with the results of the others is initially coerced to operate correctly. If such operation is not corrected within a predetermined time delay period, a failure signal is provided and the particular self-organizing control unit is inhibited from operation and removed from the control system. Simultaneously, the outputs from the other self-organizing control systems are increased by a predetermined amount to offset the signal loss due to the removal of the failed self-organizing control unit from the system. In this manner, the system can continue to operate as long as more than two, preferably, and even two of the self-organizing control units are operating properly and system failure is thereby reduced to a minimum. In order to be able to choose the control signal on a majority basis, in the event of a failure of a self-organizing control unit, an odd number of units is always maintained operative. Therefore, upon failure and removal of one faulty unit, a second operative unit must also be removed from the system.

It is therefore an object of this invention to provide a redundant self-organizing control system capable of removing faulty units from the system.

It is a further object of this invention to provide a self-organizing control system capable of coercing faulty units into proper operation.

It is a still further object of this invention to provide a self-organizing control system capable of operating without failure as long as more than two, preferably, or as long as two units of the system are operable.

The above objects and still further objects of the invention will immediately become apparent to those skilled in the art after consideration of the following preferred embodiment of the invention which is provided by way of example and not by way of limitation, wherein:

FIG. 3 is a circuit diagram of the warning and failure indicator of the present invention;

FIG. 4 is a circuit diagram of the disconnect circuit of the comparison logic; and FIG. 5 is a circuit diagram of the remainder of the disconnect circuitry and the weighting circuitry controlled by the disconnect circuitry of FIG. 4 and comprising the summing circuit for providing the $U_c$ signal of FIG. 1.

Figure 1:
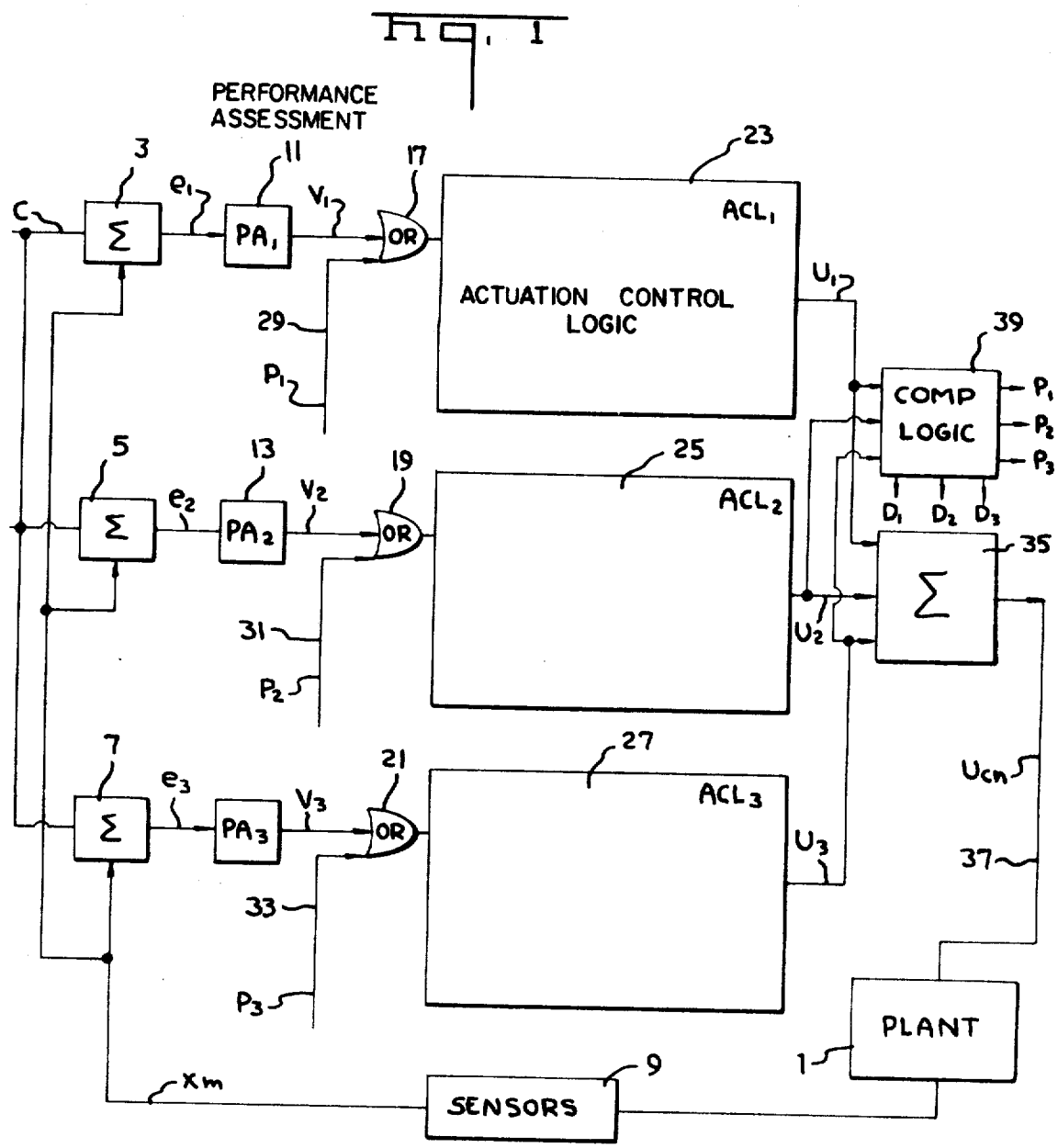
FIG. 1 is a block diagram of a redundant self-organizing control system in accordance with the present invention.

Referring now to FIG. 1, there is shown a block diagram of the preferred embodiment of the present invention. The system includes an input command signal C and an output channel control signal $U_{ch}$ for controlling the plant 1. It is apparent that the plant is generic for any function that is under control, this for example being pitch rate or acceleration of an aircraft, temperature or pressure and the like of a process, etc. The control system of the present invention, as shown in the preferred embodiment, includes three self-organizing control systems connected in parallel. For reasons to be described hereinbelow, the number of such parallel self-organizing control units can be increased as desired, the limiting factor being merely one of economics and the system using three units being merely exemplary.

As shown in FIG. 1, the command signal C is applied to a plurality of summing circuits 3, 5, and 7, the command signals being summed with the output $X_m$ from the sensors 9 which are shown positioned remote from the plant 1. It should be understood, as set forth in the above identified copending applications, that the sensors 9 may be physically located at the plant 1. As described in the above identified copending applications, the output of the summing circuit 3 is an error signal $e_1$ which is applied to performance assessment unit 11 to provide an output value signal $V_1$. In the preferred embodiment, the value signal $V_1$ will be a logical "zero" when the system is operating in proper manner and will be a logical "one" when the system performance is regressive. Therefore, a logical one applied to the OR gate 17 will be indicative of regressive action by the system and cause the actuation control logic circuit 23 to change operation in the manner described in the above identified copending applications. It can be seen that, in the event a logical "one" is applied to the "punish" line 29, the OR gate 17 will continually apply a signal to the actuation control logic indicative of regressive system action and thereby attempt to coerce the self-organizing control unit number one (having subscripts 1) into proper operation. The same manner of operation will be provided in the self-organizing control systems having subscripts 2 (including performance assessment unit 13) and 3 as set forth in FIG. 1.

Under normal system operation, each of the actuation control logic units 23, 25 and 27 will provide its output control signal $U_1$, $U_2$ and $U_3$ respectively, these output signals being summed in the summing circuit 35 and passed along the channel control line 37 as the $U_{ch}$ signal to control the plant 1. The control signals $U_1$, $U_2$ and $U_3$ will also be applied to a comparison logic circuit 39, which will be described in greater detail hereinbelow, wherein these command signals are compared to determine if the systems are operating properly. In the event of a fault which is detected therein, an output punishment signal P1, P2 or P3 is provided along the lines 29, 31 and 33 and fed to the respective OR gates 17, 19 and 21 to attempt to coerce the improperly operating self-organizing control unit into proper operation. In the event that, after a predetermined time delay, the punishment signals P are unable to coerce their associated self-organizing control unit into proper operation, a disconnect is provided and the entire self-organizing control unit under faulty operation will be disconnected from the circuit and the summation circuit 35 will automatically be adjusted to increase the level of the signals received from the remaining properly operating control systems. In this manner, it is possible to remove an improperly operating system from the circuit and continue operation with the remaining properly operating systems, this being done on a majority rule basis.

It should be understood that, in the event a plurality of units, such as, for example, five self-organizing control units, were being utilized in parallel it would always be necessary to retain an odd number of operating units in order to provide the majority control system if such operation is desired. For this reason, it may be desirable to remove an even number of self-organizing control units from the circuit whenever a faulty unit is to be disconnected. Under these circumstances, assuming five parallel units are being used, upon the indication of a first faulty system and disconnect, two of the units would be removed from the circuit, leaving three. Upon the next indication of a faulty circuit, it would be necessary to remove two additional circuits, thereby leaving one circuit for operation. However, since at this time only two of the five originally operating units have been found to be defective, the unit which was operational but removed along with the first faulty unit to the located can now be returned to the circuit, thereby providing three operational self-organizing control units and allowing the system to continue operation until the next failure is provided. In this manner, it can be seen that the number of failures which the system can handle before shutdown is equal to the number of parallel self-organizing control units in the system minus two. This will be explained in more detail hereinbelow.

Figure 2:
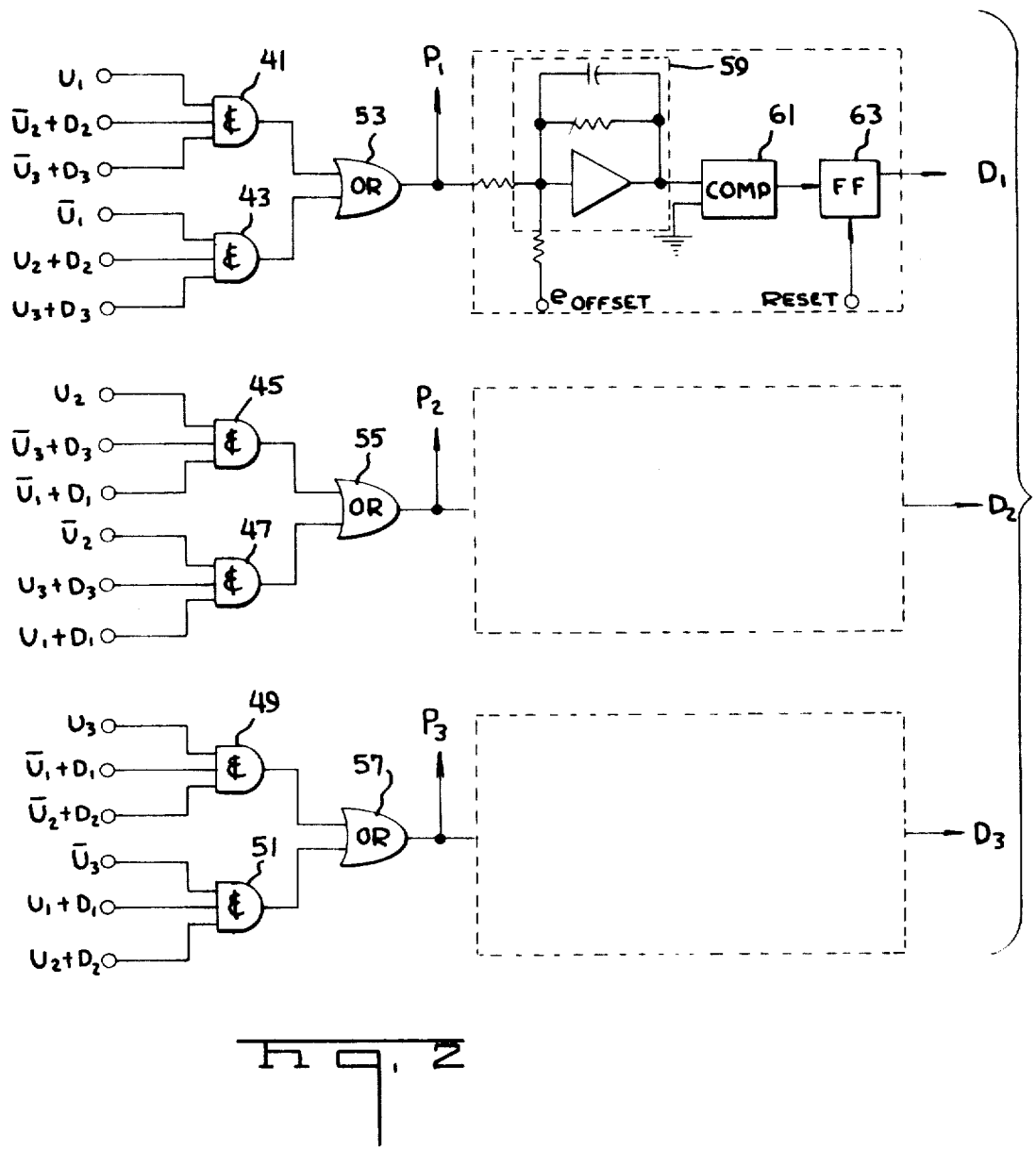
FIG. 2 is a circuit of a portion of the comparison logic block of FIG. 1.

Referring now to FIG. 2, there is shown a portion of the comparison logic circuitry 39 of FIG. 1. FIG. 2 includes three identical circuits, each responsive for operation with an associated self-organizing control unit of FIG. 1. The uppermost circuit is designed to provide a punishment signal PI in the event that the use of one command signal is not the same as those emanating from the actuation control logic circuits 25 and 27. In the event, for example, that the $U_1$ signal is different from the $U_2$ and the $U_3$ signals, one of the AND gates 41 and 43 will be opened and provide a signal to the OR gate 53 for providing a punishment signal PI to coerce the self-organizing control unit 1 and, specifically, actuation control logic 23 thereof into proper operation. During this coercion time, the output of OR gate 53 will be applied to the integrator 59. The integrator will be charged up until such time as the self-organizing control unit number 1 is coerced into proper operation by the punishment signal PI. In the event that the integrator 59 is charged up to a predetermined threshold value prior to coercion of self-organizing control unit number 1 into proper operation, the comparator circuit 61 will provide a trigger signal to set the flip-flop 63 and thereby provide a disconnect signal $D_1$ to disconnect the self-organizing control unit number 1 from the system in a manner to be described in more detail hereinbelow. It can be seen that the remaining circuits of FIG. 2 comprising the elements 45, 47, 49, 51, 55 and 57 will operate in the identical manner for the self-organizing control unit 2 and 3.

FIG. 3 is a warning and failure circuit wherein a warning signal is present when any one of the disconnect signals $D_1$, $D_2$ or $D_3$ is provided by failure of the associated self-organizing control unit. A failure signal is provided when any two of the three disconnect signals is provided simultaneously, indicating that two of the three units are operating improperly.

Referring now to FIG. 4, there is shown relay circuitry controlled by the disconnect signals $D_1$, $D_2$ and $D_3$. Each of the disconnect signals operates a 1, circuit associated with the self-organizing controller of identical subscript. For example, upon the existence of a disconnect signal $D_1$, a signal will be provided to the transistor 65 and 1, operation of the relay 67 indicated as $K_1$. In the same manner, a disconnect signal $D_2$ will operate the relay 69 indicated as $K_2$ and a disconnect signal $D_3$ will operate the relay 71 indicated as $K_3$.

Referring now to FIG. 5, there is shown a circuit diagram which corresponds to the summing circuit 35 of FIG. 1. It can be seen that each of the control signals $U_1$, $U_2$ and $U_3$ is provided along a separate input line. The relay contacts 73, 75 and 77 are normally closed, thereby allowing their respective signals $U_1$, $U_2$ and $U_3$ to pass to the $U_{CH}$ line. The relay contacts marked 79, 81, 83, 85, 87 and 89 are normally open and are closed upon operation of the corresponding relay (FIG. 4) to provide a shunting path around the resistors 91, 93, and 95. It can be seen that under normal system operation, each of the signals $U_1$, $U_2$ and $U_3$ will be added and passed through the amplifier 109 and the normally closed relay contacts 97, 99, 101, 103, 105 and 107 to the output channel $U_{cA}$. Upon operation of the disconnect signal, for example, D1, the relay 67 will be operated and act upon all the $K_1$ switches. Accordingly, the switch 73 will be open, thereby eliminating $U_1$ from the output channel $U_{cA}$. At the same time, the signals provided by U2 and U3 will be enhanced by operation of the switches 85 and 87 which will now be closed and thereby shunt the resistors 93 and 95, thereby decreasing the impedance in the patch and increasing the signal applied to the amplifier 109. The ratio of resistance between resistors 111 and 91 will be 2 to 1, resistor 111 having twice the resistance of resistor 91. The resistance values 91, 93 and 95 will be identical with each other as will resistance values of resistors 111, 113 and 115 be identical with each other.

The switches 97, 99, 101, 103, 105 and 107 are provided to remove all the self-organizing control units from the network in the event that two of the three systems shown fail. It can be seen that the switches are arranged such that an open circuit is provided between the amplifier 109 and the output channel $U_{cA}$ for every possible combination of two of the three self-organizing control units. In this manner, it can be seen that the control signals are enhanced whenever one of the self-organizing control units is eliminated from the circuit due to failure, and that the entire self-organizing control system is removed from the circuit upon failure of two out of the three units. It is, of course, apparent to those skilled in the art that the above described system can be expanded to encompass more than three parallel units and such units are included herein as obvious modifications of the disclosed specific embodiment of the invention.

As stated previously, in order to provide a system capable of operating on a majority basis, it is necessary to remove an operating self-organizing control unit from the system when an inoperative unit is removed to maintain an odd number of parallelled units on line. To provide a circuit capable of performing the above described operation, and assuming, by way of example only, that the system includes five parallel self-organizing control units, the binary level output of each unit is continuously monitored and compared to the output of the four other units to detect variance from the majority. The only requirement is that the output be binary in nature or, if analog, that they be signum detected and this binary level signum $U_i$ be used as $U_i$ in a logic system. If over some period of time (determined by the time constant of a lag circuit 59) a given branch continues to disagree with the majority, it is disconnected from the system. As a consequence of this disconnection, another branch is arbitrarily selected and disconnected to leave a system with an odd number of branches, i.e., three. Comparison of individual output signals with that of the majority continues. In the event another branch is judged a failure, it is disconnected and the branch previously disconnected to preserve an odd number of branches is reconnected to the system. Thus, two units failed and were disconnected and three units still are on line. Comparison continues as before. If now a third branch is deemed a failure, it is disconnected and the two remaining carry the load. A continued disagreement between the remaining two branches will result in total system shutoff and failure indicator. The gain of the U signal summer can readily be modified in relation to the number of branches on line to preserve overall loop gain, as was done with the three branch system as described in FIGS. 4 and 5.

The circuitry of the above described system would be as set forth in the following Boolean equations which fully describe the required circuit.

Assuming the following definitions:

$U_i$ = binary level output signal of $i$th branch $P_i$ = logic signal indicator that $i$th branch disagrees with majority $D_i$ ≡ logic signal indicator that ith branch is assumed to have failed and has been disconnected (irreversible except by reset)

$D_i'$ = logic signal indicator that ith branch has been disconnected from system to preserve odd number of branches (reversible)

$D_i'' \equiv D_i + D_i'$, hence $\bar{D}_i'' = \bar{D}_i \times \bar{D}_i$ $W_1$ ≡ Warning indicator for single branch failure
$W_2$ ≡ Warning indicator for double branch failure
$W_3$ Warning indicator for triple branch failure
$F$ ≡ Failure indicator, at least four branch failures It then follows that:

$W_1 = (D_1 + D_2 + D_3 + D_4 + D_5) \overline{W}_2 \cdot \overline{W}_3 \cdot \overline{F}$ $W_2 = (D_1D_2 + D_1D_3 + D_1D_4 + D_1D_5 + D_2D_3 + D_2D_4 + D_2D_5 + D_3D_4 + D_3D_5 + D_4D_5) \overline{W}_3 \cdot \overline{F}$ $W_3 = (D_1D_2D_3 + D_1D_2D_4 + D_1D_2D_5 + D_1D_3D_4 + D_1D_3D_5 + D_1D_4D_5 + D_2D_3D_4 + D_2D_3D_5 + D_2D_4D_5 + D_3D_4D_5) \overline{F}$ $F = D_1D_2D_3D_4 + D_1D_2D_3D_5 + D_1D_2D_4D_5 + D_1D_3D_4D_5 + D_2D_3D_4D_5$ $P_{i_{avg}} > K,\ 0.5 < K < 1.0 \rightarrow D_i = 1$ $D_i' = D_{i-1} \bar{D}_{i+1} \bar{D}_{i+2} \bar{D}_{i+3}$ $P_i = \bar{D}_i' \{[u_i(\bar{u}_{i+1} + D_{i+1}'')(\bar{u}_{i+2} + D_{i+2}'')(\bar{u}_{i+3} + D_{i+3}'')$
$\quad + \bar{u}_i(u_{i+1} + D_{i+1}'')(u_{i+2} + D_{i+2}'')(u_{i+3} + D_{i+3}'')]$
$[(\bar{D}_{i+1}'' + \bar{D}_{i+2}'')(\bar{D}_{i+1}'' + \bar{D}_{i+3}'')(\bar{D}_{i+2}'' + \bar{D}_{i+3}'')]$
$+ [u_i(\bar{u}_{i+1} + D_{i+1}'')(\bar{u}_{i+2} + D_{i+2}'')(\bar{u}_{i+4} + D_{i+4}'')$
$\quad + \bar{u}_i(u_{i+1} + D_{i+1}'')(u_{i+2} + D_{i+2}'')(u_{i+4} + D_{i+4}'')]$
$[(\bar{D}_{i+1}'' + \bar{D}_{i+2}'')(\bar{D}_{i+1}'' + \bar{D}_{i+4}'')(\bar{D}_{i+2}'' + \bar{D}_{i+4}'')]$
$+ [u_i(\bar{u}_{i+1} + D_{i+1}'')(\bar{u}_{i+3} + D_{i+3}'')(\bar{u}_{i+4} + D_{i+4}'')$
$\quad + \bar{u}_i(u_{i+1} + D_{i+1}'')(u_{i+3} + D_{i+3}'')(u_{i+4} + D_{i+4}'')]$
$[(\bar{D}_{i+1}'' + \bar{D}_{i+3}'')(\bar{D}_{i+1}'' + \bar{D}_{i+4}'')(\bar{D}_{i+3}'' + \bar{D}_{i+4}'')]$
$+ [u_i(\bar{u}_{i+2} + D_{i+2}'')(\bar{u}_{i+3} + D_{i+3}'')(\bar{u}_{i+4} + D_{i+4}'')$
$\quad + \bar{u}_i(u_{i+2} + D_{i+2}'')(u_{i+3} + D_{i+3}'')(u_{i+4} + D_{i+4}'')]$
$[(\bar{D}_{i+2}'' + \bar{D}_{i+3}'')(\bar{D}_{i+2}'' + \bar{D}_{i+4}'')(\bar{D}_{i+3}'' + \bar{D}_{i+4}'')]\}$ The $\bar{D}_i'$ term is to assure $P_i$ remains low during the period that the ith branch has been disconnected to preserve an odd number of branches.

The above equations fully set forth the required circuitry to perform the above described operations for a typical five branch system.

Though the invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

We claim:

1. A self-checking control system which comprises an odd plurality of control devices, said control devices acting in parallel with each other to provide a control output, and means responsive to a fault in one of said control devices for removing said one of said control devices and an additional one of said control devices from said system.

2. A self-checking control system as set forth in claim 1 further including means responsive to a second faulty device for removing said second faulty device from said system and replacing said additional one of said devices into said system.

3. A self-checking control system as set forth in claim 1 further including means responsive to removal of said devices from said system for increasing the output of the remaining ones of said odd plurality of control devices to retain the level of said control output.

4. A self-checking control system as set forth in claim 2 further including means responsive to removal of said devices from said system for increasing the output of the remaining ones of said odd plurality of control devices to retain the level of said control output.

5. A self-checking control system as set forth in claim 1 further including means responsive to the existence of only two nonfaulty devices for retaining said system in operation and means responsive to a nonmatch of said two devices for shutting down said system.

6. A self-checking control system as set forth in claim 2 further including means responsive to the existence of only two nonfaulty devices for retaining said system in operation and means responsive to a nonmatch of said two devices for shutting down said system.

7. A self-checking control system as set forth in claim 3 further including means responsive to the existence of only two nonfaulty devices for retaining said system in operation and means responsive to a nonmatch of said two devices for shutting down system.

8. A self-checking control system as set forth in claim 4 further including means responsive to the existence of only two nonfaulty devices for retaining said system in operation and means responsive to a nonmatch of said two devices for shutting down said system.

9. A self-checking control system which comprises a plurality of control devices acting in parallel to provide a single control signal, means responsive to the faulty operation of any one of said control devices to coerce said one of said control devices into proper operation and means responsive to a predetermined time length of faulty operation of said one of said control devices for shutting down said one of said control devices.

10. A self-checking control system as set forth in claim 9 wherein an odd plurality of said devices is present in said system.

11. A self-checking control system as set forth in claim 10 wherein said means responsive to faulty operation in one of said control devices for shutting down said device also removes an additional one of said control devices from said system.

12. A self-checking control system as set forth in claim 11 further including means responsive to a second faulty device for removing said second faulty device from said system and replacing said additional one of said devices into said system.

13. A self-checking control system as set forth in claim 11 further including means responsive to removal of said devices from said system for increasing the output of the remaining devices to retain the level of said control signal.

14. A self-checking control system as set forth in claim 12 further including means responsive to removal of said devices from said system for increasing the output of the ones of said devices operating in said system to retain the level of said control signal.

15. A self-checking control system as set forth in claim 11 further including means responsive to the existence of only two nonfaulty devices for retaining said system in operation and means responsive to a nonmatch of said two devices for shutting down said system.

16. A self-checking control system as set forth in claim 12 further including means responsive to the existence of only two nonfaulty devices for retaining said system in operation and means responsive to a nonmatch of said two devices for shutting down said system.

17. A self-checking control system as set forth in claim 13 further including means responsive to the existence of only two nonfaulty devices for retaining said system in operation and means responsive to a nonmatch of said two devices for shutting down said system.

18. A self-checking control system as set forth in claim 14 further including means responsive to the existence of only two nonfaulty devices for retaining said system in operation and means responsive to a nonmatch of said two devices for shutting down said system.